US011363073B2

(12) United States Patent
Maino et al.

(10) Patent No.: US 11,363,073 B2
(45) Date of Patent: *Jun. 14, 2022

(54) ON-DEMAND SECURITY ASSOCIATION MANAGEMENT

(71) Applicant: Cisco Technology, Inc., San Jose, CA (US)

(72) Inventors: Fabio R. Maino, Palo Alto, CA (US); Vina Ermagan, Marina Del Rey, CA (US); Alberto Rodriguez Natal, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/034,100

(22) Filed: Sep. 28, 2020

(65) Prior Publication Data
US 2021/0014285 A1 Jan. 14, 2021

Related U.S. Application Data

(63) Continuation of application No. 15/903,820, filed on Feb. 23, 2018, now Pat. No. 10,848,524.

(51) Int. Cl.
H04L 29/06 (2006.01)
H04L 12/46 (2006.01)
H04L 9/40 (2022.01)

(52) U.S. Cl.
CPC ........ H04L 63/205 (2013.01); H04L 12/4633 (2013.01); H04L 63/0272 (2013.01);
(Continued)

(58) Field of Classification Search
CPC ............... H04L 63/205; H04L 12/4633; H04L 63/0272; H04L 63/0281; H04L 63/0428;
(Continued)

(56) References Cited

U.S. PATENT DOCUMENTS 6,330,562 B1 12/2001 Boden et al.
7,447,901 B1 * 11/2008 Sullenberger ....... H04L 63/0272
713/153
(Continued)

FOREIGN PATENT DOCUMENTS

WO 2014/062337 A1 4/2014

OTHER PUBLICATIONS

D. Farinacci, et al., "Locator/ID Separation Protocol (LISP) Data-Plane Confidentiality", Internet Engineering Task Force (IETF), ISSN: 2070-1721, Feb. 2017, 18 pgs.
(Continued)

Primary Examiner — Quazi Farooqui
(74) Attorney, Agent, or Firm — Edell, Shapiro & Finnan, LLC

(57) ABSTRACT

An ingress network element obtains data from a source endpoint associated with the ingress network element. The data identifies a destination endpoint remote from the ingress network element. The ingress network element provides a map request identifying the destination endpoint to a mapping server. The ingress network element obtains a map reply including a network address of an egress network element associated with the destination endpoint and a security association. The ingress network element encrypts the data for the destination endpoint with the security association according to a cryptographic policy based on the source endpoint, the destination endpoint, and the availability of cryptographic resources on the network. The ingress network element provides the encrypted data to the egress network element.

20 Claims, 10 Drawing Sheets

(52) U.S. Cl.
CPC ...... *H04L 63/0281* (2013.01); *H04L 63/0428* (2013.01); *H04L 63/20* (2013.01); *H04L 2209/76* (2013.01); *H04L 2212/00* (2013.01)

(58) Field of Classification Search
CPC . H04L 63/20; H04L 2209/76; H04L 2212/00; H04L 29/06; H04L 12/46
See application file for complete search history.

(56) References Cited

U.S. PATENT DOCUMENTS

| | | | |
|---|---|---|---|
| 7,895,648 B1* | 2/2011 | Nandy | H04L 63/164 |
| | | | 726/14 |
| 8,356,177 B2 | 1/2013 | McGrew et al. | |
| 9,258,218 B2 | 2/2016 | Hampel et al. | |
| 9,560,018 B2 | 1/2017 | Bellagamba et al. | |
| 2002/0062344 A1 | 5/2002 | Ylonen et al. | |
| 2004/0158706 A1 | 8/2004 | Moritomo et al. | |
| 2006/0242695 A1 | 10/2006 | Nedeltchev et al. | |
| 2008/0229095 A1 | 9/2008 | Kalimuthu et al. | |
| 2011/0067089 A1 | 3/2011 | Allard et al. | |
| 2015/0058913 A1 | 2/2015 | Kandasamy et al. | |
| 2017/0026417 A1 | 1/2017 | Ermagan et al. | |
| 2017/0054758 A1 | 2/2017 | Maino et al. | |

OTHER PUBLICATIONS

V. Moreno, et al., "LISP Virtual Private Networks (VPNs)", draft-ietf-lisp-vpn-01, Network Working Group, Nov. 15, 2017, 16 pgs.
Earls, "Software defined networking security enables granular policy control", Essential Guide, SDN basics for service providers, http://searchsdn.techtarget.com/tip/Software-defined-networking-security-enables-granular-policy-control, downloaded from the Internet Feb. 23, 2018, 3 pgs.
F. Maino, et al., "GPE-VPN: Programmable LISP-based Virtual Private Networks", draft-maino-gpe-vpn-00, LISP Working Group, Mar. 21, 2016, 11 pgs.
International Search Report and Written Opinion in corresponding International Application No. PCT/US2019/017779, dated Apr. 16, 2019, 15 pages.
F. Maino et al., "LISP-Security (LISP-SEC)", draft-ietf-lisp-sec-14, Network Working Group, Internet-Draft, Intended status: Standards Track, Oct. 25, 2017, 23 pages.

* cited by examiner

ON-DEMAND SECURITY ASSOCIATION MANAGEMENT

CROSS-REFERENCE TO RELATED APPLICATION

This application is a continuation of U.S. application Ser. No. 15/903,820, filed Feb. 23, 2018, the entirety of which is incorporated herein by reference.

TECHNICAL FIELD

The present disclosure relates to configuring network elements in a software defined computer network.

BACKGROUND

Software defined networks can provide a uniform, wired or wireless, access to a campus fabric via an on-demand overlay that covers the campus fabric and can be stretched to the branches and to the cloud. A software defined network can provide an end-to-end overlay, which may be provisioned on-demand, and provides any-to-any connectivity and policy enforcement. The connectivity and policy enforcement is provided in a domain that stretches from the data center edge, to the campus network, any branches, as well as to the cloud without imposing any topology limitations. Software defined networking provides two basic virtualization services to the endpoints: macro-segmentation and micro-segmentation.

The routers of the network provide macro segmentation by acting as a Virtual Tunnel Endpoint (VTEP) and inserting a Virtual Network Identifier (VNI) tag in each frame. The VTEP uses the VNI to ensure that network traffic that belongs to a certain virtual network will only reach endpoints that belong to the same virtual network.

The VTEP routers provide micro-segmentation by classifying subsets of endpoints belonging to the same virtual network into different security groups. Frames are marked with a Source Group Tag (SGT) belonging to the security group of the source endpoint and Destination Group Tag (DGT) belonging to the security group of the destination endpoint. Access control policies are applied to each <SGT, DGT> pair, in the form of a security group Access Control List (ACL). Each ACL effectively micro-segments the virtual network into the different security groups.

In typical overlay deployments, encryption tunnels and security associations are provisioned per VTEP-pair. Each security association for a source/destination VTEP pair is used to encrypt all of the traffic from the source VTEP to the destination VTEP.

DESCRIPTION OF EXAMPLE EMBODIMENTS

Overview

Figure 1:
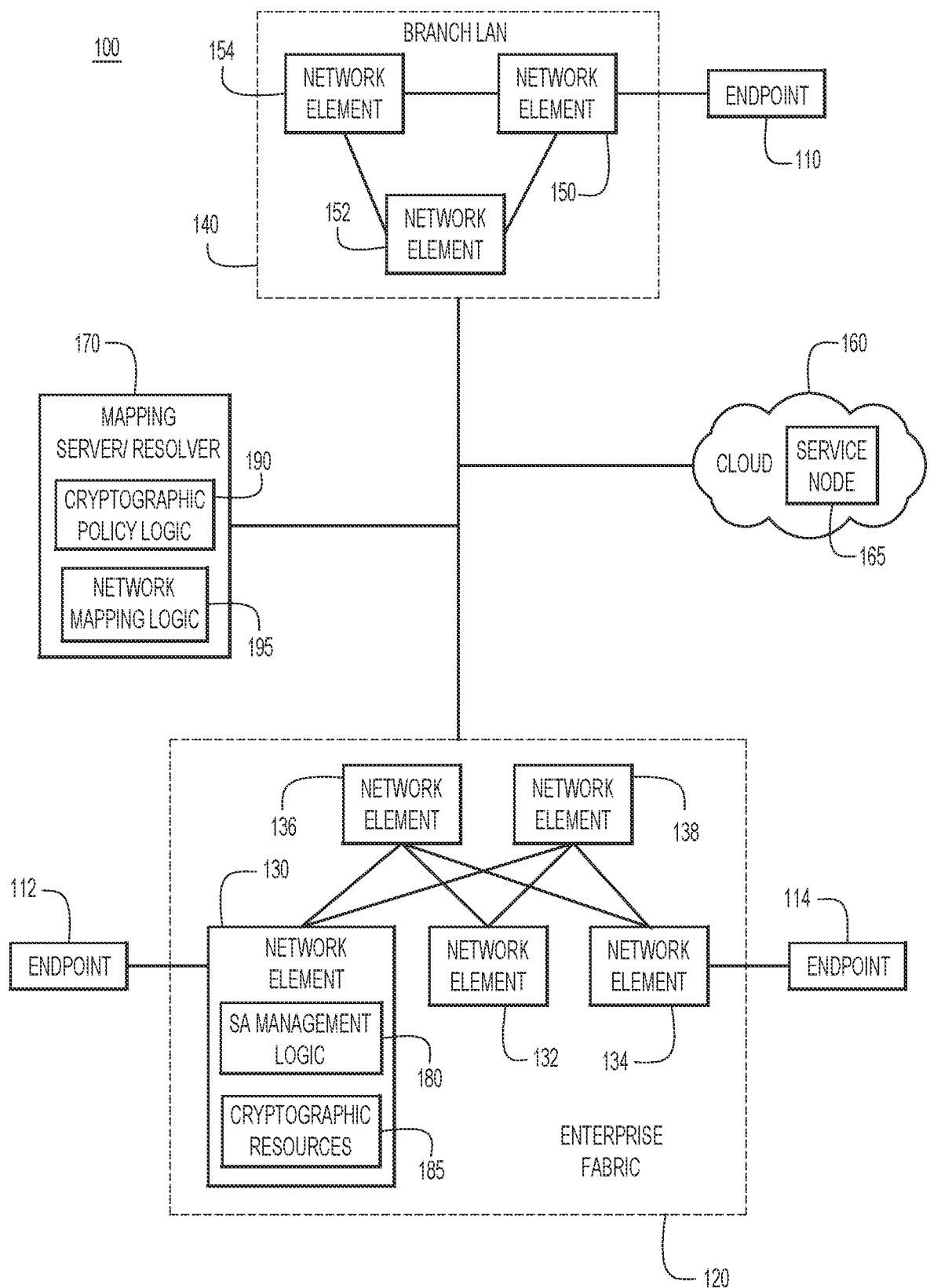
FIG. 1 is a simplified block diagram of a system for managing security associations in a software defined network, according to an example embodiment.

In one embodiment, a computer-implemented method is provided for a mapping server to provision network elements to optimize the cryptographic resources on the cryptographic overlay. The method includes obtaining from a first network element among a plurality of network elements, a request for a first endpoint to communicate with a second endpoint across the plurality of network elements. The method further includes determining a cryptographic policy based on the first endpoint, the second endpoint, and an availability of cryptographic resources on the plurality of network elements. The method also includes identifying a second network element among the plurality of network elements based on the cryptographic policy. The second network element is associated with the second endpoint. The method includes selecting a security association based on the cryptographic policy to secure a communication from the first endpoint to the second endpoint. The security association secures the communication between the first network element and the second network element. The method further includes providing the security association to the first network element with a network address of the second network element.

DETAILED DESCRIPTION

Extending a software defined network to the cloud may introduce further issues with scalability. Connecting campus and branch network fabrics to a multicloud, microservice, containerized network extension increases the number of VTEPs by at least an order of magnitude. Additionally, with an increasing number of cloud-based applications, tunneling from a branch to the main campus and then to the cloud becomes increasingly taxing on the network infrastructure and introduces a further challenge in terms of scaling end-to-end confidentiality and integrity protection services. Scalability may also be further challenged by the need for a fine grain encryption mechanism that may enforce different encryption policies for different virtual networks or different security groups within each virtual network.

In one example, a service provider may want to encrypt traffic that flows between two VTEPs. However, traffic flows that belong to one entity (e.g., corporation A) should use a different key/encryption algorithm than the key/encryption algorithm for flows that belong to another entity (e.g., corporation B). Similarly, within a single enterprise, different encryption keys/algorithms may be required to encrypt traffic that flows between distinct <SGT,DGT> pairs. For instance, stronger confidentiality may be desired for communications between endpoints that belong to executives of a company than for communications between endpoints belonging to service employees of the company.

Typically, at a small scale, dynamically deploying per-virtual network identifier (VNI) or per-group security associations may be addressed by initially provisioning a semi-static cryptographic overlay that connects all of the VTEPs in a full mesh, and then dynamically provisioning the overlay of end-to-end tunnels on top of the cryptographic overlay. The end-to-end tunnels may provide micro-macro segmentation, multi-homing, mobility, path engineering, and other virtualization services by piggybacking on the semi-static cryptographic overlay. This approach may be called a "bolt-on" approach where a static, full mesh encryption overlay is bolted on to the network underlay before the dynamic end-to-end overlay is provisioned on top of the bolt-on encryption layer.

The bolt-on approach limits the scale of the number of VTEPs that can be connected end-to-end with encryption, due to the large amount of cryptographic state information that would need to be pre-provisioned to each of the VTEPs. Security Associations (SAs) are typically established with a peer-to-peer SA negotiation protocol such as Internet Protocol Security/Internet Key Exchange version 2 (IPsec/IKEv2) or distributed from group key servers, such as IPsec Group Domain of Interpretation (GDOI). Neither IKEv2 nor GDOI implementations provide the scalability, fine granularity, and dynamic control as the techniques presented herein.

The techniques presented herein combine the negotiation of cryptographic SAs with the dynamic provisioning of the endpoint identity/location mappings, preventing unnecessary cryptographic state pre-provisioning. Additionally, the techniques presented herein extend the selection of the encryption policy to finer-grained levels, such as per-VNI or per-security-group. The dynamic building of the cryptographic topology avoids the constraints of a fixed bolt-on topology and enables the network to best match the intent of the high level cryptographic policy with an optimal use of limited cryptographic resources available in the network underlay.

In the dynamic provisioning system described herein, the mapping server that traditionally serves the identity/location mapping also relays and/or stores (in an encrypted form) the state associated with each SA. This allows for various cryptographic state distribution models where the state may be 1) pulled on-demand from the mapping server when needed by a VTEP (sender or receiver) as a data plane driven event, 2) stored at the sending VTEP and provided to the receiver VTEP via the data plane to minimize the amount of cryptographic information stored at the receiver and maximize the number of SAs handled by the receiver, or 3) pushed to the receiver via the overlay control plane in a way similar to traditional key negotiation mechanisms.

Referring now to FIG. 1, a computer network system 100 is shown that is configured to be dynamically provisioned with cryptographic information (e.g., SAs). The system 100 is configured to communicate data between endpoints 110, 112, and 114. In one example, the endpoints may be computing devices, such as desktop computers, laptop computers, smart phones, tablet computers, servers, virtual machines, or internet telephones. Endpoints 112 and 114 are connected to an enterprise fabric 120 comprising network elements 130, 132, 134, 136, and 138. In particular, endpoint 112 is connected to the enterprise fabric 120 via the network element 130, and endpoint 114 is connected via the network element 134. Endpoint 110 is connected to a branch local area network (LAN) 140 comprising network elements 150, 152, and 152. In particular, the endpoint 110 is connected to the branch LAN via the network element 150. While the enterprise fabric 120 and the branch LAN 140 are depicted with example network topologies (e.g., Clos, ring, etc.), any type of network underlay (e.g., LAN, wide area network (WAN), wired, wireless, etc.) may benefit from the techniques described herein.

The system 100 also includes a cloud network 160 with a service node 165 (e.g., a cloud-based application). The system 100 further includes a mapping server 170 configured to dynamically provision VTEPs (e.g., network elements) for secure, any-to-any connectivity.

The network element 130 is shown to include SA management logic 180 and cryptographic resources 185. In one example, the cryptographic resources 185 may include a combination of processing power and memory resources that are measured by the number of SAs that the network element 130 is able to handle. Each of the other network elements (e.g., network elements 132, 134, 136, 138, 150, 152, and 154) may include similar SA management logic and cryptographic resources. For instance, the cryptographic resources 185 of the network element 130 may be able to handle three SAs, while the analogous cryptographic resources of the network element 136 may be able to handle a larger number of SAs (e.g., 300).

The mapping server 170 includes cryptographic policy logic 190 and network mapping logic 195. The cryptographic policy logic 190 enables the mapping server 170 to dynamically provide each network element with the appropriate SA based on the cryptographic resources available and the high level policy of communication between the source and destination endpoints. The network mapping logic 195 enables the mapping server 170 to dynamically provide each network element with the network address of a destination network element that is associated with the destination endpoint. In one example, the cryptographic policy logic 190 and the network mapping logic 195 may function cooperatively to provide a synergy in the dynamic provisioning of cryptographic information and network information. For instance, the network mapping logic 195 may determine a destination network element based in part on the cryptographic policy and/or cryptographic resources available at each network element.

In one example, the network element 130 may provide a notification of the availability of the cryptographic resources 185 to the mapping server 170. The cryptographic policy logic 190 in the mapping server 170 may use the availability of the cryptographic resources 185 to determine a cryptographic policy for one or more of the network elements in network 120 and/or network 140. Similarly, all of the network elements (e.g., network elements 132, 134, 136, 138, 150, 152, and/or 154) throughout the system 100 may notify the mapping server 170 of the availability of cryptographic resources on each respective network element. The cryptographic policy logic 190 may determine cryptographic policies for each network element based on the availability of the cryptographic resources indicated in the notifications received from any or all of the network elements.

Figure 2:
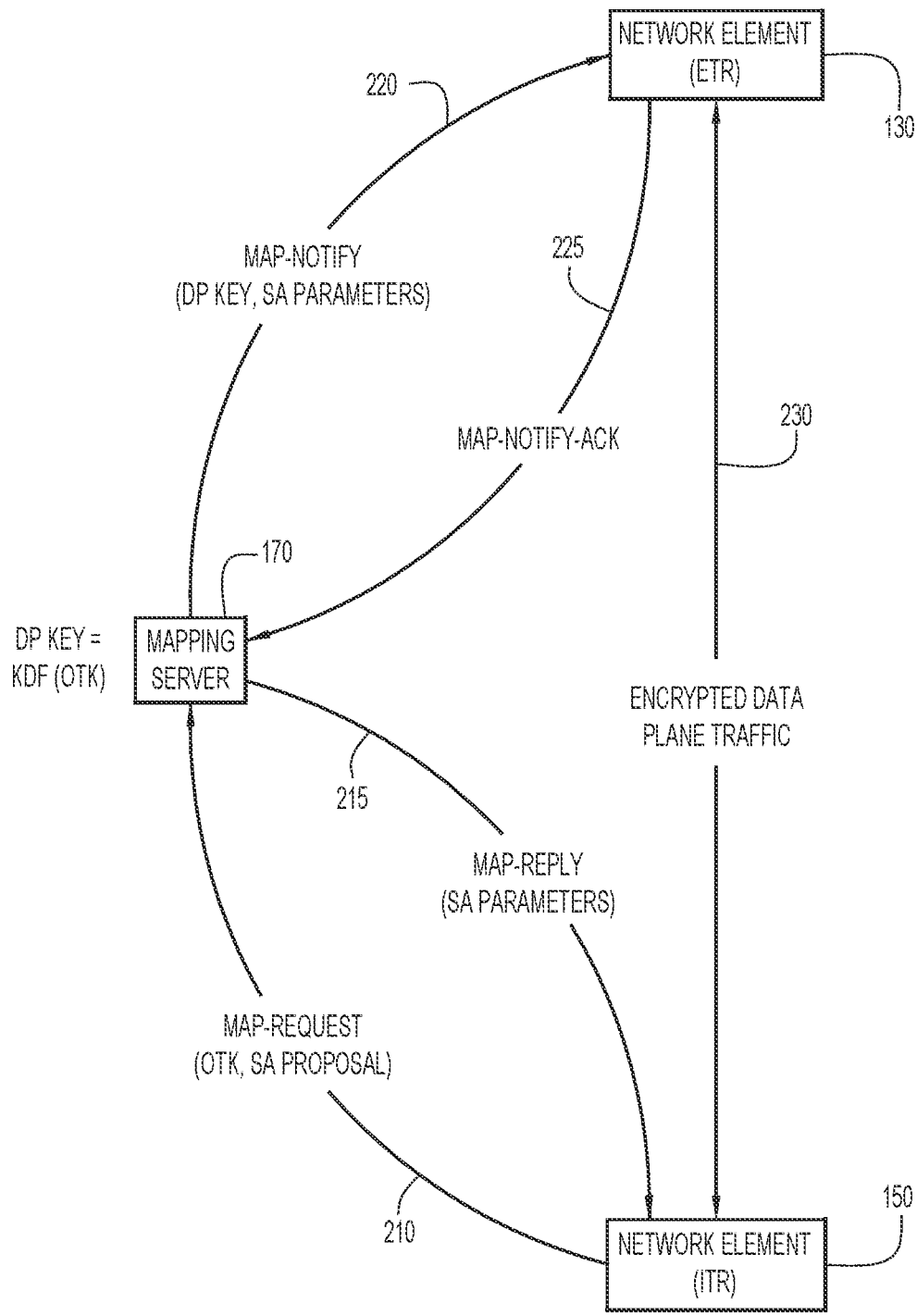
FIG. 2 is a simplified block diagram illustrating the provisioning of an encrypted data tunnel, according to an example embodiment.

Referring now to FIG. 2, a simplified block diagram illustrates one example of a network element initiating an encrypted tunnel to another network element. As the initiator of the encrypted tunnel from the network element 150 to the network element 130, the network element 150 functions as an Ingress Tunnel Router (ITR). The network element 130 functions as an Egress Tunnel Router (ETR). The ITR network element 150 sends a request 210 to the mapping server 170 over a pre-established secure connection. The request 210 may include a one-time key (OTK) and a proposal for SA parameters (e.g., encryption algorithm, key length, etc.). The mapping server 170 uses a Key Derivation Function (KDF) with the OTK as an input to generate a data plane key that will be used to encrypt data in the tunnel from the ITR network element 150 to the ETR network element 130. The mapping server 170 sends a reply 215 to the ITR network element 150 in response to the request 210. The reply 215 includes a network address for the ETR network element 130 and SA parameters (e.g., KDF, encryption algorithm, etc.) that control the SA that the ITR network element 150 will use to encrypt data traffic to the ETR network element 130.

The mapping server 170 sends a notice 220 to the ETR network element 130, which replies with an acknowledgement message 225. The notice 220 may include the data plane key derived at the mapping server 170 and the SA parameters for the encrypted tunnel from the ITR network element 150. Once the ITR network element 150 and the ETR network element 130 have set up the SA to secure an encrypted tunnel, the ITR network element 150 may begin sending encrypted data plane traffic 230 through the encrypted tunnel to the ETR network element 130.

In one example, the mapping exchange depicted in FIG. 2 is a Locator/Identity Separation Protocol (LISP) exchange that is typically used to provide on-demand mapping retrieval to determine the Router Locator (RLOC) of the ETR (i.e., the destination of the encapsulating tunnel). In particular, the mapping server 170 may be configured to use a LISP Map-Request/Map-Reply protocol in a proxy reply mode. In other words, the Map-Reply 215 is generated by the mapping server 170 rather than the ETR network element 130.

Additionally, the LISP-Security (LISP-SEC) protocol may be extended to generate data plane keys and negotiate the SA parameters. Typically, LISP-SEC is used to authenticate the mapping contained in the Map-Reply message. The ITR generates an OTK, which is securely transported to the mapping server over a Datagram Transport Layer Security (DTLS) session or a TLS connection. The mapping server uses the OTK to sign part of the mapping that will be included in the Map-Reply. Using a KDF, the mapping server cryptographically generates a key that is sent to the ETR, and the ETR signs additional mapping data included in the Map-Reply.

In one example described with respect to FIG. 2, the LISP-SEC protocol may be extended to cryptographically derive data plane encryption keys and carry SA parameters (e.g., SA selector, KDF, Security Parameter Index (SPI), cryptographic algorithm, etc.). The ITR (e.g., network element 150) proposes a unidirectional SA to the mapping server/resolver (e.g., mapping server 170), which completes the SA establishment with the ITR on behalf of the ETR (e.g., network element 130). In other words, the mapping server is configured in a proxy-reply mode with a role to act as a proxy for the ETR. Additionally, the mapping server may use the LISP Map-Notify message, secured over DTLS, to notify the ETR of the newly established SA. The Map-Notify message may transport the SA parameters, including the data plane encryption key, to the ETR. Once the ETR acknowledges receipt of the Map-Notify message, the mapping server may dispose of the SA state, including the data plane encryption key. After the unidirectional SA is established the ITR may begin encrypting data plane traffic to the ETR using the negotiated data plane key and the associated SA parameters.

Additionally, Map-Request, Map-Reply, and Map-Notify messages may be extended to implement SA management operations (e.g., SA refresh, cancellation, etc.). The LISP control plane messages are formatted in a flexible LISP Canonical Address Format (LCAF) encoding that may be extended to add message-specific metadata. For instance, the high level cryptographic policy may be adjusted by a network administrator, requiring one or more network elements to reconfigure SAs. In one example, the network administrator may determine that a particular ITR is going to change from per-VNI SAs to per-tunnel SAs. The mapping server may direct the ITR and any related ETRs to update their respective SAs according to the updated policy.

In another example, the mapping server may determine that the optimal cryptographic overlay requires a source network element to change from an end-to-end tunnel with the destination network element to a proxy tunnel to a re-encapsulation network element, as described below in connection with FIG. 6. In this example, the mapping server may direct the source network element to update both the SA and the network address of the "destination" network element to configure a secure tunnel to the re-encapsulation network element instead of directly to the destination network element.

Figure 3:
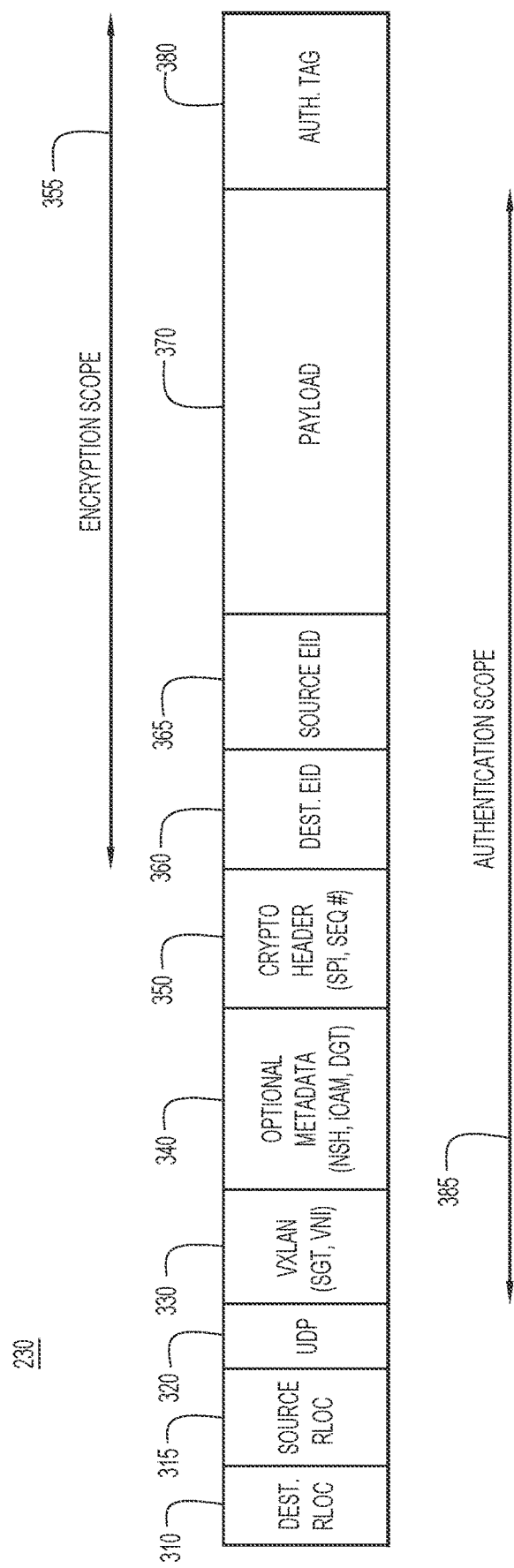
FIG. 3 is a simplified block diagram of an encrypted data frame, according to an example embodiment.

Referring now to FIG. 3, an example of an encrypted data frame 230 is shown to illustrate varying levels of granularity in applying cryptographic resources, such as security associations. The encrypted data frame 230 includes a destination address 310 (e.g., the RLOC associated with the ETR), a source address 315 (e.g., the RLOC associated with the ITR), and a User Datagram Protocol (UDP) header 320. The data frame 230 further includes a Virtual Extensible Local Area Network (VXLAN) header 330, which may include a Source Group Tag (SGT) and/or a Virtual Network Identifier (VNI). An optional metadata header 340 may include a Network Service Header (NSH), In-situ Operations, Administration, and Maintenance (IOAM) data, and/or a Destination Group Tag (DGT). A cryptographic header 350 defines the parameters of the encryption scope 355 that will be secured in the data frame 230. The cryptographic header may include the Security Parameter Index (SPI) and/or the sequence number.

Within the encryption scope 355, the data frame 230 includes a destination Endpoint Identifier (EID) 360, a source EID 365, and the payload 370. The data frame 230 ends with an authentication tag 380 that determines the authentication scope 385 of the data frame 230. The authentication scope 385 includes the VXLAN header 330, the optional metadata 340, the cryptographic header 350, the destination EID 360, the source EID 365, and the payload 370.

In one example, the data plane encryption of the data frame 230 is based on an Authenticated Encryption with Additional Authenticated Data (AEAD mode that provides confidentiality to the inner IP payload (e.g., the payload 370) and authentication to the virtualization layers (e.g., the VXLAN header 330 and any optional metadata header 340).

The on-demand negotiation and establishment of SAs described herein enable SA granularity finer than the typical per-RLOC pairwise SAs due to the optimization of the cryptographic resources of the network elements. For instance, SAs may be established on a per-tunnel basis to protect any frame in a specific overlay tunnel by using an SA selector of the source RLOC (sRLOC) 315 and the destination RLOC (dRLOC) 310. In other words, each <sRLOC, dRLOC> pair would be assigned a separate SA to secure any traffic between the two network elements associated with that particular sRLOC and dRLOC.

At a finer granularity level, SAs may be established on per-VNI basis to provide different quality of encryption to different virtual networks that run over the same overlay tunnel. In other words, a different SA would be assigned to each SA selector triplet <sRLOC, dRLOC, VNI>. This SA selector ensures that data which travels between the same two network elements but on different virtual network (e.g., for two different corporations) will be secured with different encryption.

At a still finer granularity level, SAs may be established on a per-security-group basis to provide different quality encryption to different group pairs in the same virtual network over the same overlay tunnel. In other words, each SA selector from the group <sRLOC, dRLOC, VNI, SGT, DGT> would be assigned a separate SA. This enables a different level of security for each security group, even when the data is on the same virtual network over the same overlay tunnel.

With on-demand provisioning of SAs, the mapping system dynamically builds a topology of cryptographic tunnels that best match the intent of a higher level cryptographic policy. Typically, the ability of network elements to handle multiple SAs limits the scalability of cryptographic overlays, which may force network administrators to restrict the topology of the network. For instance, a set of computing devices that are topologically close, may be grouped in a domain and encrypt traffic from each of the set of computing devices to a hub that acts as an aggregation point of various security associations. Traffic is then re-encrypted to the destination network element, or to another hub that is topologically close to the destination network element. This approach does not fully utilize the SA resources in the network elements, may force unnecessary topology restrictions, and may not maximize end-to-end encryption.

The cryptographic overlay described herein builds on the proven scalability of a locator/ID mapping system and the granularity of the dynamic mapping lookup to provide the foundation for an on-demand, scalable, fine-grained, end-to-end, secure overlay. In this cryptographic overlay, end-to-end tunnels are provisioned on demand, as long as the source VTEP and destination VTEP have sufficient cryptographic resources. In other words, as long as the network elements can handle an additional SA, an end-to-end tunnel will be provisioned on demand. When a VTEP runs short of cryptographic resources, traffic that does not match the existing granular SAs will be encrypted to a Re-encapsulation Tunnel Router (RTR) with more cryptographic resources. The RTR enforces the more granular encryption/decryption policy on behalf of the VTEP. A small subset of cryptographic resources are reserved on any VTEP that may run short on cryptographic resources to ensure that a secure tunnel to a more capable network element can be initiated.

Figure 4:
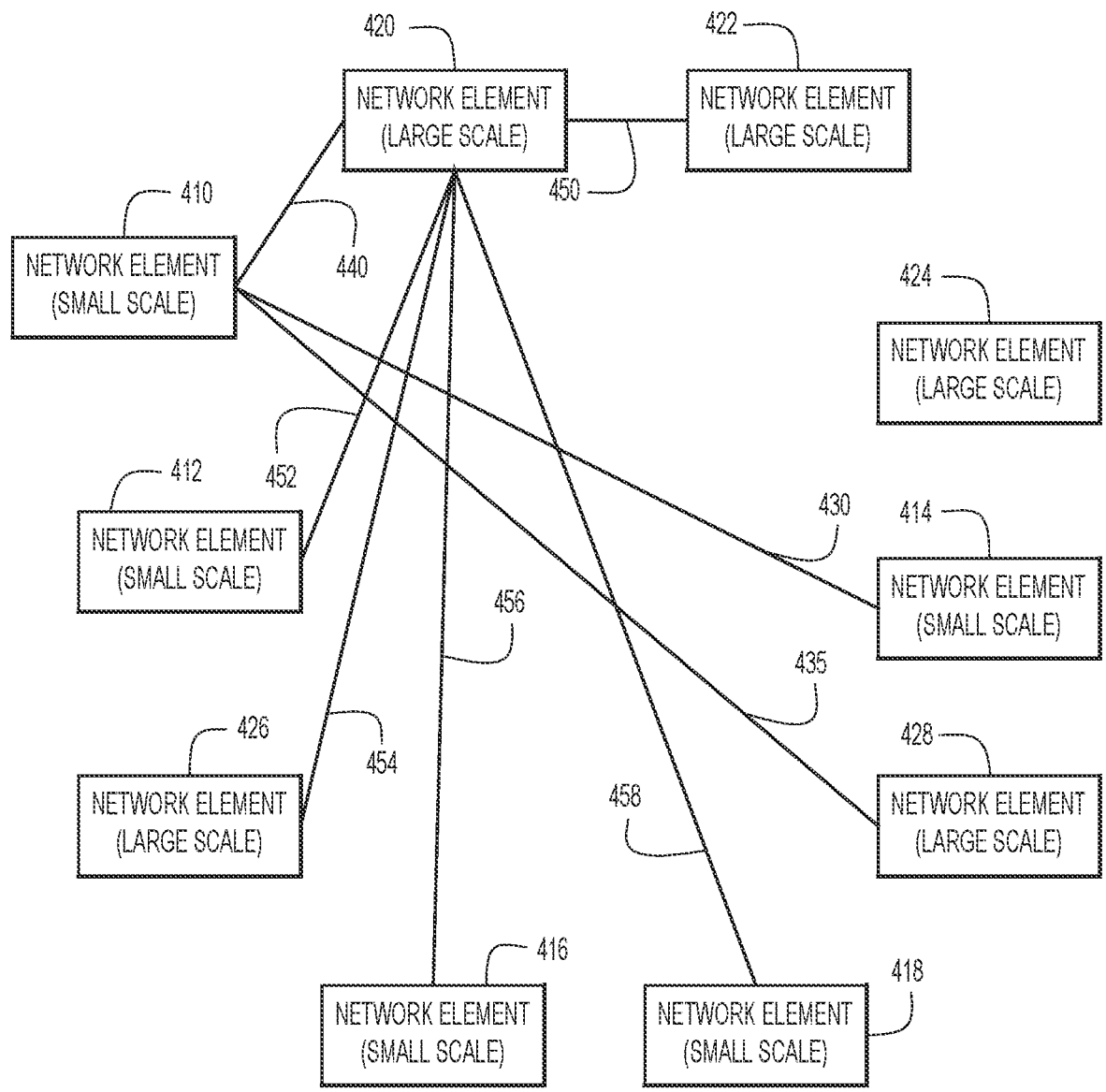
FIG. 4 illustrates dynamic provisioning of cryptographic resources in a software defined network, according to an example embodiment.

Referring now to FIG. 4, a simplified block diagram illustrates an example of the efficient and dynamic use of cryptographic resources available in a network 400. The network 400 includes network elements 410, 412, 414, 416, 418, 420, 422, 424, 426, and 428. In this example, network elements 410, 412, 414, 416, and 418 are relatively small scale routers that have limited cryptographic resources (e.g., the small scale routers can only handle 3 SAs). In contrast, the network elements 420, 422, 424, 426, and 428 are relatively large scale routers that have larger amounts of cryptographic resources (e.g., the large scale routers can handle hundreds of SAs).

In the example of FIG. 4, the network element 410 first establishes end-to-end tunnels 430 and 435 to network elements 414 and 428, respectively. After establishing the tunnels 430 and 435 with separate SAs, the network element 410 is running short on cryptographic resources, since it is a small scale router. The network element 410 then creates a "proxy" tunnel 440 to the network element 420, which is a large scale router and has sufficient cryptographic resources to function as a re-encapsulation router. Any remaining traffic from the network element 410 that is not directed to network elements 414 or 428 (e.g., traffic directed to network element 412) is sent to the network element 420 over the "proxy" tunnel 440.

The network element 420 decrypts any traffic arriving from the network element 410 over the tunnel 440, and re-encrypts it to the appropriate destination using the appropriate cryptographic policy obtained via the mapping system. When the network element 410 has traffic destined for the network element 422, the traffic is first sent over the tunnel 440 to the network element 420. The network element 420 then obtains the cryptographic policy (e.g., from the mapping server not shown in FIG. 4) for traffic between the network element 410 and the network element 422, and initiates the tunnel 450 with the appropriate cryptographic policy and SA.

Similarly, traffic from the network element 410 that is directed to the network elements 412, 426, 416, and 418 are first sent over the tunnel 440 to the network element 420. The network element 420 obtains appropriately granular cryptographic policies for each of the traffic flows and generates tunnels 452, 454, 456, and 458 for traffic from the network element 410 to the network elements 412, 426, 416, and 418, respectively. In this way, the network element 410, with the support of network element 420, will apply the proper cryptographic policy to traffic destined to network elements 422, 412, 426, 416, and 418. In the reverse direction, with the coordination of the mapping system, traffic directed to the network element 410 from the network element 422, 412, 426, 416, and 418 is first directed to the network element 420, and then re-encrypted to be sent to the network element 410.

The state (e.g., key and SA parameters) associated with an SA is typically stored at the ITR and ETR VTEPs. The limited number of SAs that can be stored on each VTEP ultimately impacts the quality of the cryptographic service provided in the network. The techniques described herein allow for various distribution models for the cryptographic state information.

In a first distribution model, the cryptographic information may be pulled on demand from the mapping server when needed by a network element (ITR or ETR) as a data-plane-driven event. Using this distribution model, a network element may be able to use the mapping system as an SA repository, from which individual SAs are retrieved on-demand as driven by incoming traffic. This model prioritizes a smaller amount of cryptographic resources (e.g., SA cache) at individual VTEPs at the expense of latency in setting up each SA.

In a second distribution model, the cryptographic information may be stored at the ITR and provided to the ETR via the data plane to minimize the amount of cryptographic information stored at the ETR. The number of incoming SAs handled by a small scale edge router may be effectively doubled by storing the state for those SAs at the ITRs originating the data traffic. This model enables a small scale edge router to push the cost of incoming SAs back to the source network elements. This model may also be useful for networks in which many different ITRs (e.g., individual customer network gateways) send data to the same ETR (e.g., the network gateway for a popular web server).

In a further distribution model, the cryptographic information may be negotiated between the mapping server and the ITR, and pushed to the ETR via the overlay control plane. An example of this type of distribution model is described herein with respect to FIG. 2.

Figure 5:
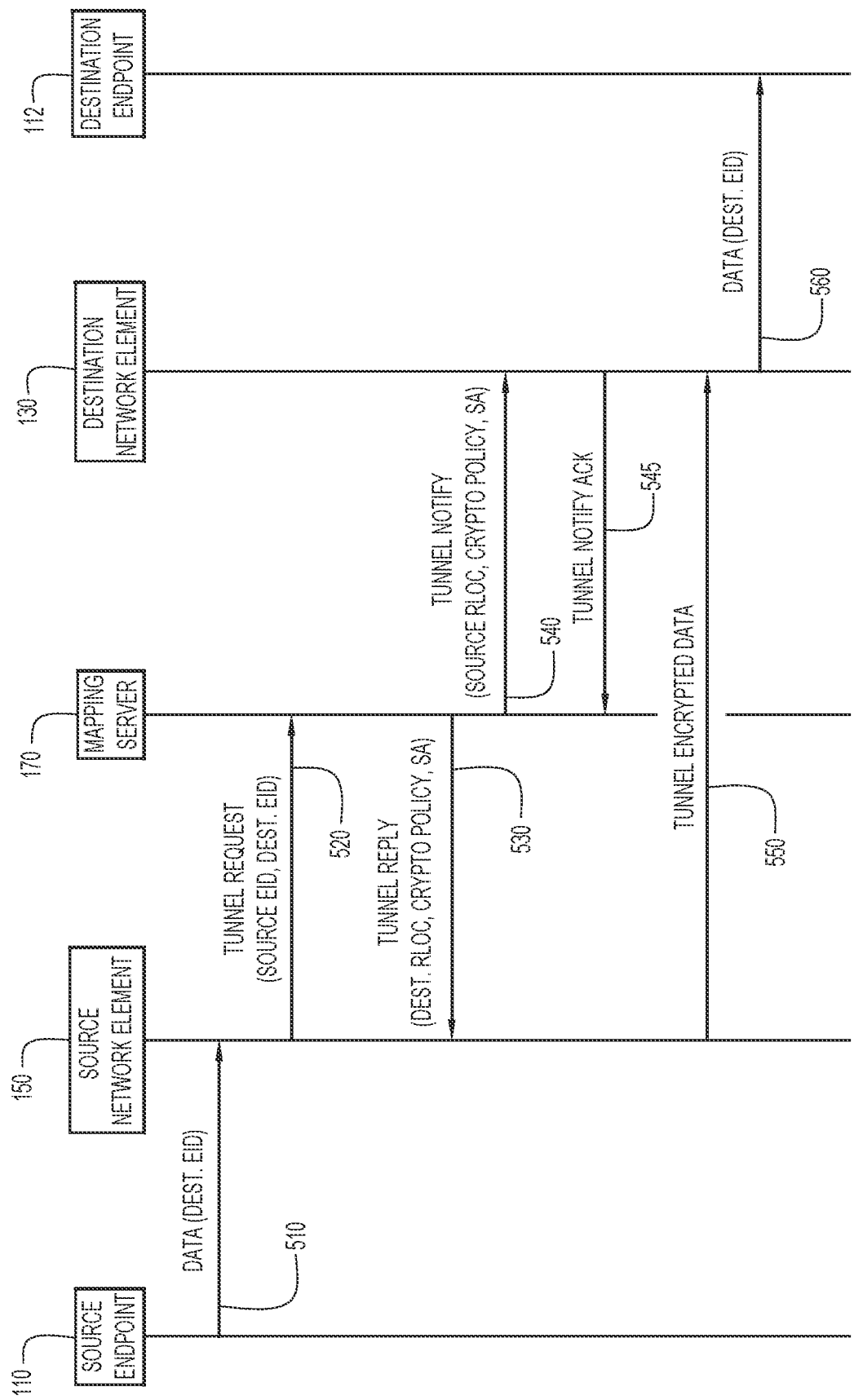
FIG. 5 illustrates provisioning network elements to send data encrypted data traffic from a source endpoint to a destination endpoint, according to an example embodiment.

Referring now to FIG. 5, a messaging diagram illustrates messages passed between elements of the network system to initiate a secure tunnel for traffic from a source endpoint 110 to a destination endpoint 112. Initially, the source endpoint 110 sends data 510 to the source network element 150. The data 510 includes an identifier for the destination endpoint 112, such as the EID in a LISP mapping system. The source network element 150 sends a request 520 to the mapping server 170 to initiate the construction of an encrypted tunnel to the destination network element 130. The tunnel request 520 includes at least an identifier of the source endpoint 110 and the destination endpoint 112. The tunnel request 520 may also include some cryptographic information, such as a one-time key and/or parameters for a SA, and an identifier for the destination network element 130.

The mapping server 170 receives the tunnel request 520 and determines the appropriate cryptographic policy for data traffic from the source endpoint 110 to the destination endpoint 112. The mapping server 170 also determines the network address (e.g., the RLOC) of the destination network element 130. The mapping server 170 sends a tunnel reply 530 to the source network element 150. The tunnel reply 530 includes the network address of the destination network element 150 along with the cryptographic policy and the SA to enact the cryptographic policy. In one example, the cryptographic policy may include an SA selector that describes the granularity (e.g., per-tunnel, per-VNI, per-Security Group, etc.) that the source network element 150 will use to determine which traffic to encrypt with the included SA.

The mapping server 170 also sends a tunnel notification 540 to the destination network element 130. The tunnel notification 540 may include the source network address (e.g., RLOC) of the source network element 150, the cryptographic policy, and the SA to secure the incoming tunnel. The destination network element 130 may send an acknowledgement 545 in response to receiving the notification 540.

Once both the source network element 150 and the destination network element 130 have set up the SA for the tunnel, the source network element 150 begins tunneling the encrypted data 550 to the destination network element 130. The destination network element 130 authenticates and decrypts the tunneled data 550 and forwards the data 560 to the destination endpoint 112.

Figure 6:
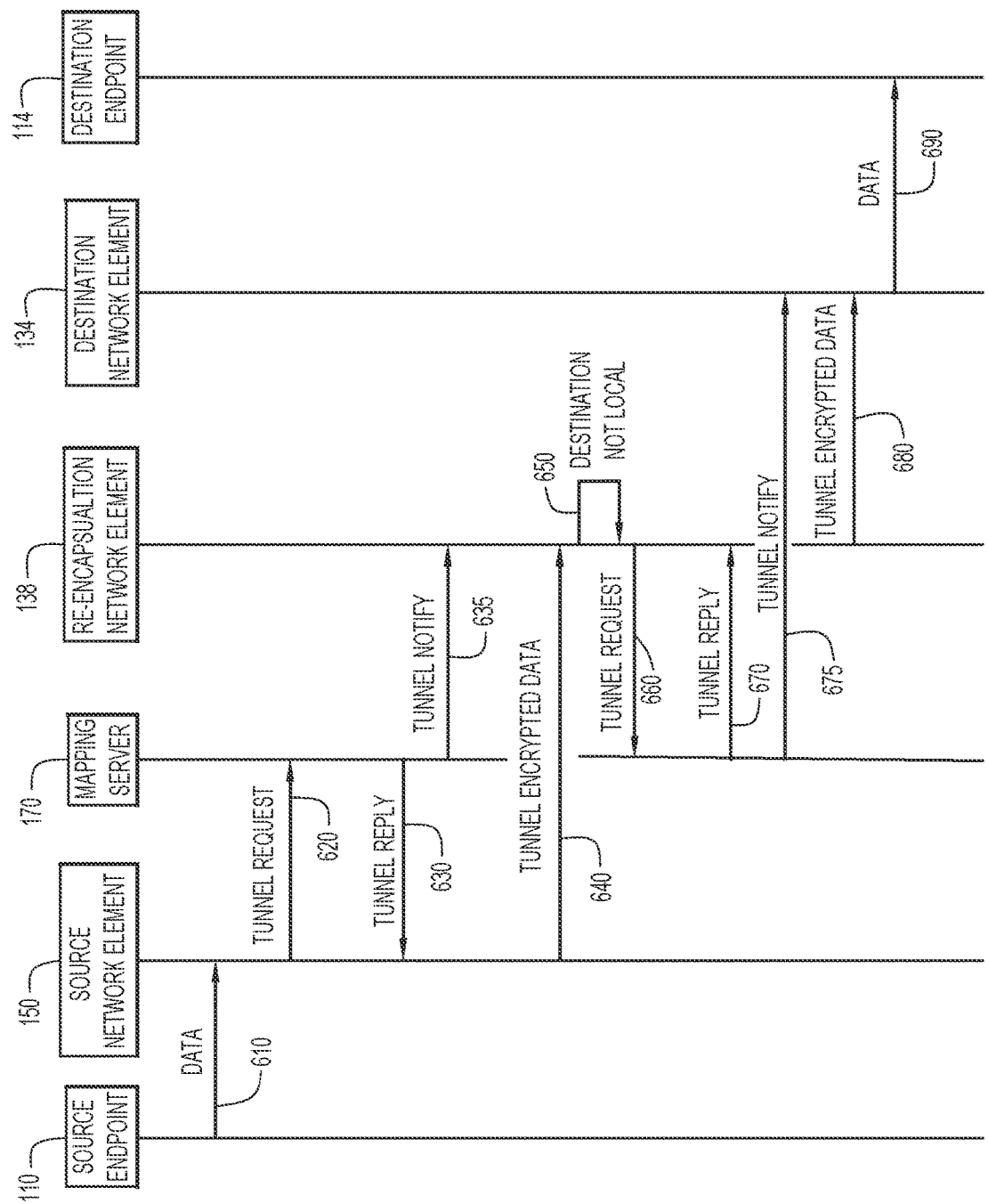
FIG. 6 illustrates provisioning network elements to send encrypted data traffic via a re-encryption router, according to an example embodiment.

Referring now to FIG. 6, a messaging diagram illustrates messages passed between elements of the network system to initiate a secure tunnel for traffic from a source endpoint 110 to a destination endpoint 114 via a re-encapsulation network element. The source endpoint 110 sends the data 610 to the source network element 150, which sends a tunnel request 620 to the mapping server 170. In this example, the mapping server 170 determines that one or both of the source/destination network element 150/134 is low on cryptographic resources, and that the data should flow through the re-encapsulation network element 138. The mapping server 170 sends a tunnel reply 630 to the source network element 150 with the network address of the re-encapsulation network element 138 and the cryptographic information (e.g., SA state information) to encrypt the data 610. The mapping server 170 also sends a tunnel notification 635 to the re-encapsulation network element 138 with the cryptographic information. Once the proper cryptographic information is configured at the source network element 150 and the re-encapsulation network element 138, the source network element 150 tunnels the data at 640 to the re-encapsulation network element 138.

On receiving and decrypting the data at 640, the re-encapsulation network element 138 determines that the destination endpoint 114 is not locally attached to the re-encapsulation network element 138 at 650. The re-encapsulation network element 138 sends a tunnel request 660 to the mapping server 170 to determine where to send the data 640 and how to re-encrypt the data 640. In one example, the tunnel request 660 identifies the source endpoint 110 and the destination endpoint 114 to ensure that the proper cryptographic policy is followed by the re-encapsulation network element 138. The mapping server 170 responds with a tunnel reply 670 to the re-encapsulation network element 138. The tunnel reply 670 includes distinct cryptographic information (e.g., SA state information) that is used to secure the tunnel between the re-encapsulation network element 138 and the destination network element 134. The mapping server 170 also sends a tunnel notification 675 to the destination network element 134 including the distinct cryptographic information to decrypt and authenticate the data in the tunnel from the re-encapsulation network element 138.

Once the re-encapsulation network element 138 and the destination network element 134 are configured with the cryptographic state information, the re-encapsulation network element 138 tunnels the data 680 to the destination network element 134. The destination network element 134 decrypts and authenticates the tunneled data 680 using the cryptographic state information and sends the decrypted data 690 to the destination endpoint 114.

The messaging diagram of FIG. 6 describes an example of sending data from the source endpoint 110 to the destination endpoint 114 via a single re-encapsulation network element 138. In another example, the cryptographic policy determined by the availability of cryptographic resources at each of the network elements may determine that the data is to be sent via two or more re-encapsulation network elements. In particular, if both the source endpoint 110 and the destination endpoint 114 lack sufficient cryptographic resources for an end-to-end secure tunnel, each endpoint may use a separate re-encapsulation network element that is closer to the respective endpoint.

Referring back to FIG. 1, a data flow may be requested from source endpoint 110 attached to network element 150 to the destination endpoint 114 attached to network element 134. The mapping server 170 may direct the network element 150 to send the data via a re-encapsulation network element on the network 140 (e.g., network element 152), a re-encapsulation network element on the network 120 (e.g., network element 138), and the network element 134 that is attached to the destination endpoint 114. In this way, a small scale network element (e.g., network element 150 or 134) may be associated with a large scale network element (e.g., network element 152 or 138) as a border gateway that has more cryptographic resources available.

In a further example, additional layers of re-encapsulation network elements may be deployed between the local re-encapsulation network elements to provide additional flexibility in adapting the cryptographic policy to a changing landscape of available cryptographic resources in the system. In general, a hierarchy of intermediary re-encapsulation network elements may be deployed with increasing cryptographic resources to assist network elements with fewer cryptographic resources.

Figure 7:
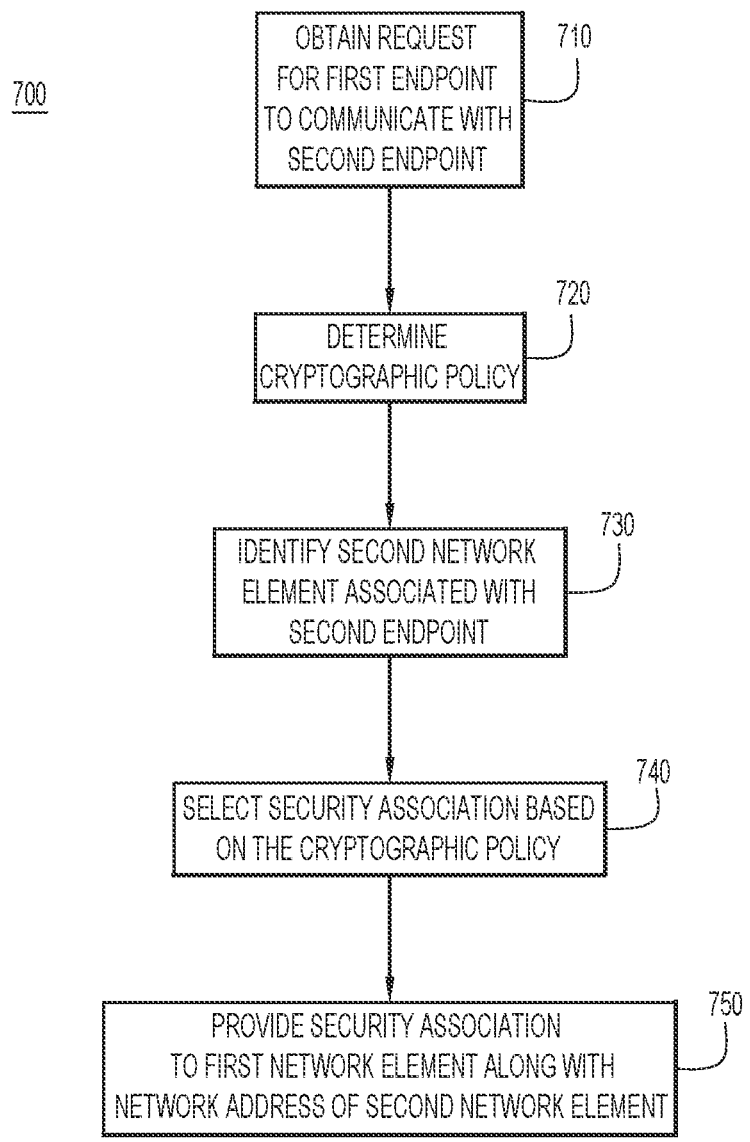
FIG. 7 is a flowchart depicting operations of a mapping server in dynamically provisioning network elements based on the overall cryptographic state of the software defined network, according to an example embodiment.

Referring now to FIG. 7, a flowchart is shown for a process 700 by which a mapping server (e.g., mapping server 170) supports the optimal configuration of cryptographic resources in network elements. At 710, the mapping server obtains from a first network element a request for a first endpoint to communicate with a second endpoint across a computer network. In one example, the request may include an identifier of the source endpoint and the destination endpoint. At 720, the mapping server determines a cryptographic policy based on the first endpoint, the second endpoint and an availability of cryptographic resources on the plurality of network elements in the computer network. In one example, the cryptographic policy may specify that communications between the source endpoint and the destination endpoint are to be secured at a particular level of granularity.

Based on the destination endpoint and the cryptographic policy, the mapping server identifies a second network element at 730. In one example, the mapping server identifies that the second network element is a network element that is directly attached to the destination endpoint. Alternatively, the cryptographic policy may determine that either the closest network element to the destination endpoint or the first network element does not have sufficient cryptographic resources to sustain an end-to-end tunnel, and the mapping server may determine that the optimal cryptographic overlay requires an intermediary network element (e.g., a re-encapsulation network element).

At 740, the mapping server selects a security association based on the cryptographic policy to secure a communication from the first endpoint to the second endpoint. The security association is used to secure the communication between the first network element and the second network element. At 750, the mapping server provides the security association to the first network element with a network address of the second network element. The mapping server may also provide the security association to the second network element.

Figure 8:
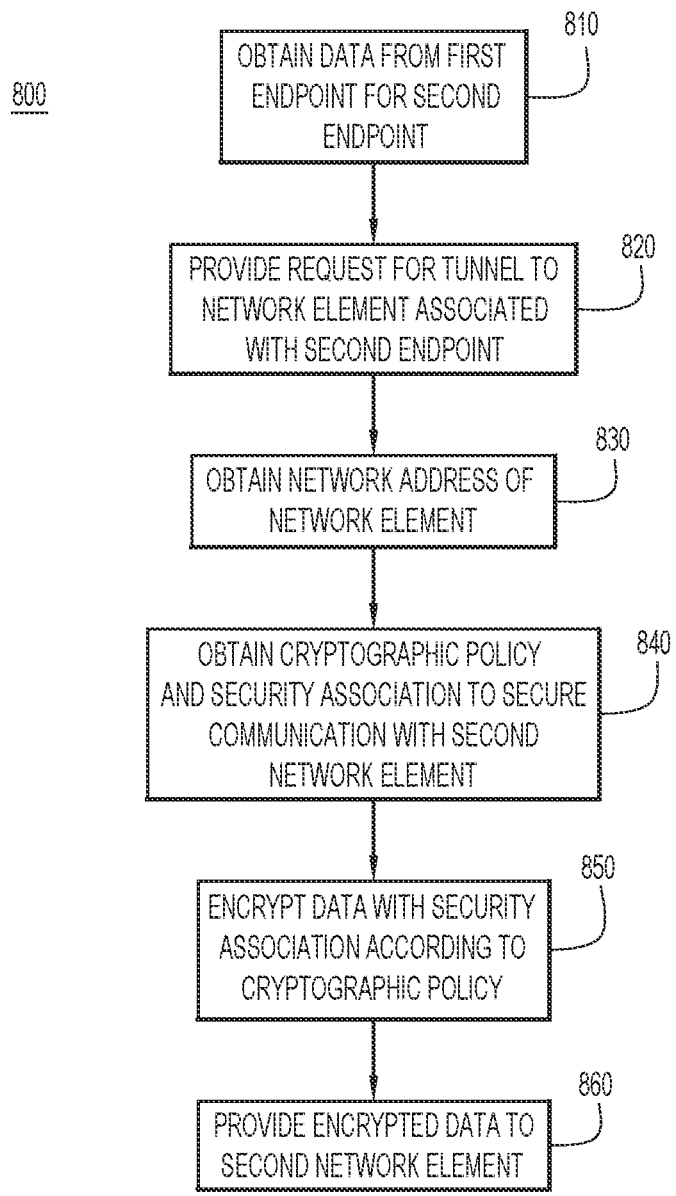
FIG. 8 is a flowchart depicting operations of a network element in being dynamically provisioned to encrypt data traffic according to a cryptographic policy, according to an example embodiment.

Referring now to FIG. 8, a flowchart is shown for a process 800 by which a source network element is configured to optimally make use of the cryptographic resources in a computer network. At 810, the source network element obtains data from a first endpoint that is directed to a second endpoint. In one example, the data may include identifiers for the first endpoint and the second endpoint. At 820, the source network element requests a tunnel to a second network element associated with the second endpoint. The source network element provides the tunnel request to a mapping server.

In response to the tunnel request, the source network element obtains a destination network address of the second network element at 830. In one example, the network address includes the RLOC of the second network element. At 840, the source network element obtains a cryptographic policy and security association to secure a communication with the second network element. At 850, the source network element encrypts the data received from the first endpoint. The source network element encrypts the data with the security association according to the cryptographic policy. At 860, the source network element provides the encrypted data to the second network element at the network address provided by the mapping server.

Figure 9:
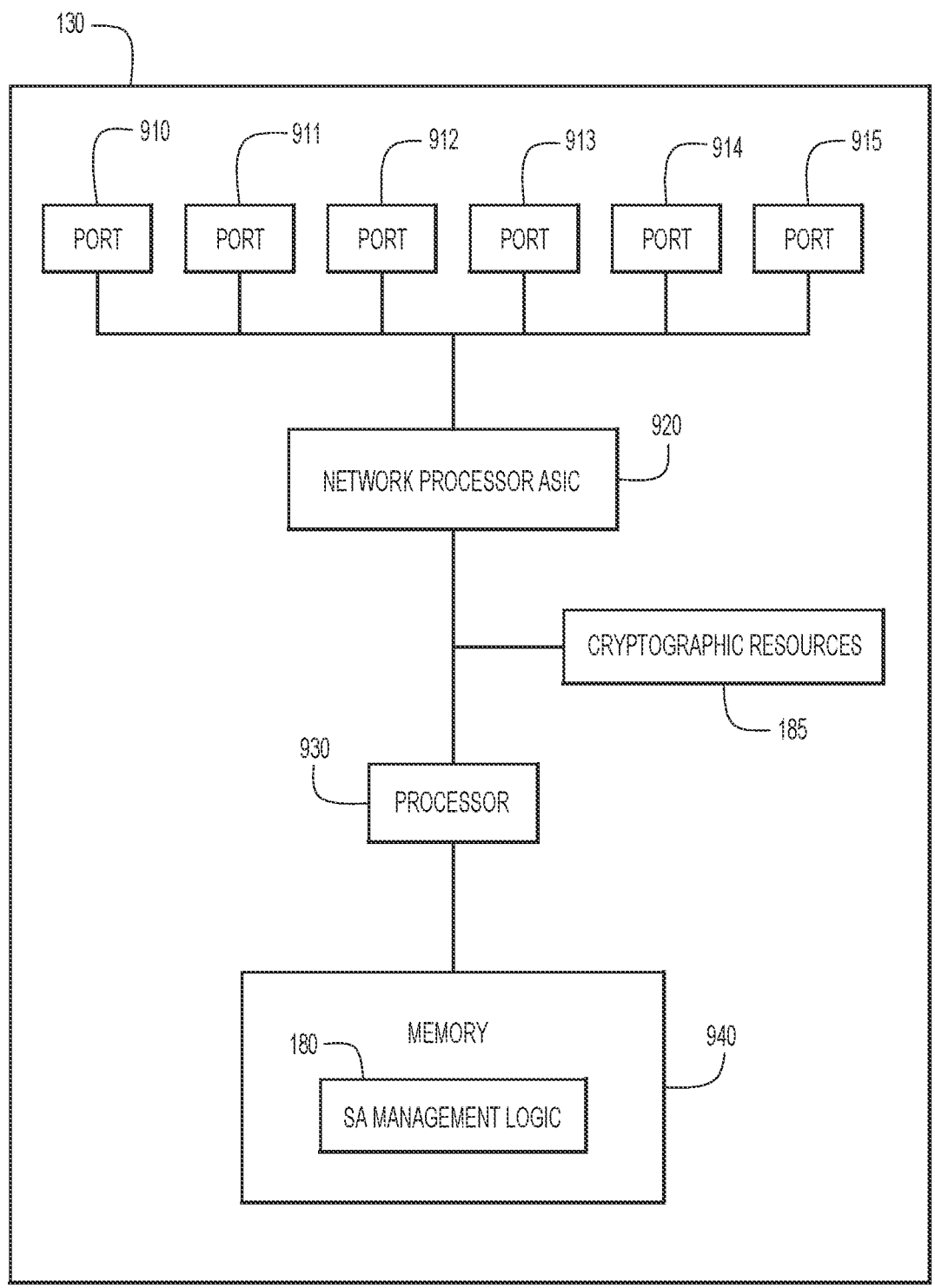
FIG. 9 is a simplified block diagram of a network device configured to manage security associations for communications with other network devices, according to an example embodiment.

Referring now to FIG. 9, a simplified block diagram is shown of a network device (e.g., network element 130) that is configured to participate in the techniques presented herein. The networking device includes a network interface unit in the form of a plurality of network ports 910-915, a processor Application Specific Integrated Circuit (ASIC) 920 that performs network processing functions, one or more processors 930 (e.g., microprocessors or microcontrollers), and memory 240. The network device 130 may include multiple network processor ASICs to perform various network processing functions. The memory 940 stores the SA management logic 180, which may include instructions for retrieving SAs to encrypt traffic that is received from one or more of the ports 910-915. The network element 130 also includes the cryptographic resources 185, which may include a separate cache to store SAs. Alternatively, a portion of the memory 940 may be used as storage in the cryptographic resources. It is to be understood that, in certain examples, the network device 130 may be a virtual (software-based) appliance. The processor 930 performs higher level control functions of the network device 130, in concert with functions of the network processor ASIC 920.

The memory 940 may include read only memory (ROM), random access memory (RAM), magnetic disk storage media devices, optical storage media devices, flash memory devices, electrical, optical, or other physical/tangible memory storage devices. Thus, in general, the memory 940 may comprise one or more tangible (non-transitory) computer readable storage media (e.g., a memory device) encoded with software comprising computer executable instructions and when the software is executed (by the one or more processors 930) it is operable to perform the operations described herein. For example, the memory 940 stores instructions for the SA management logic 180 described above. When the processor 930 executes the instructions for the SA management logic 180, the processor 930 is caused to control the network device 130 to perform the operations described herein. As an alternative, the functions of the SA management logic 180 may be performed by the network processor ASIC 920.

Figure 10:
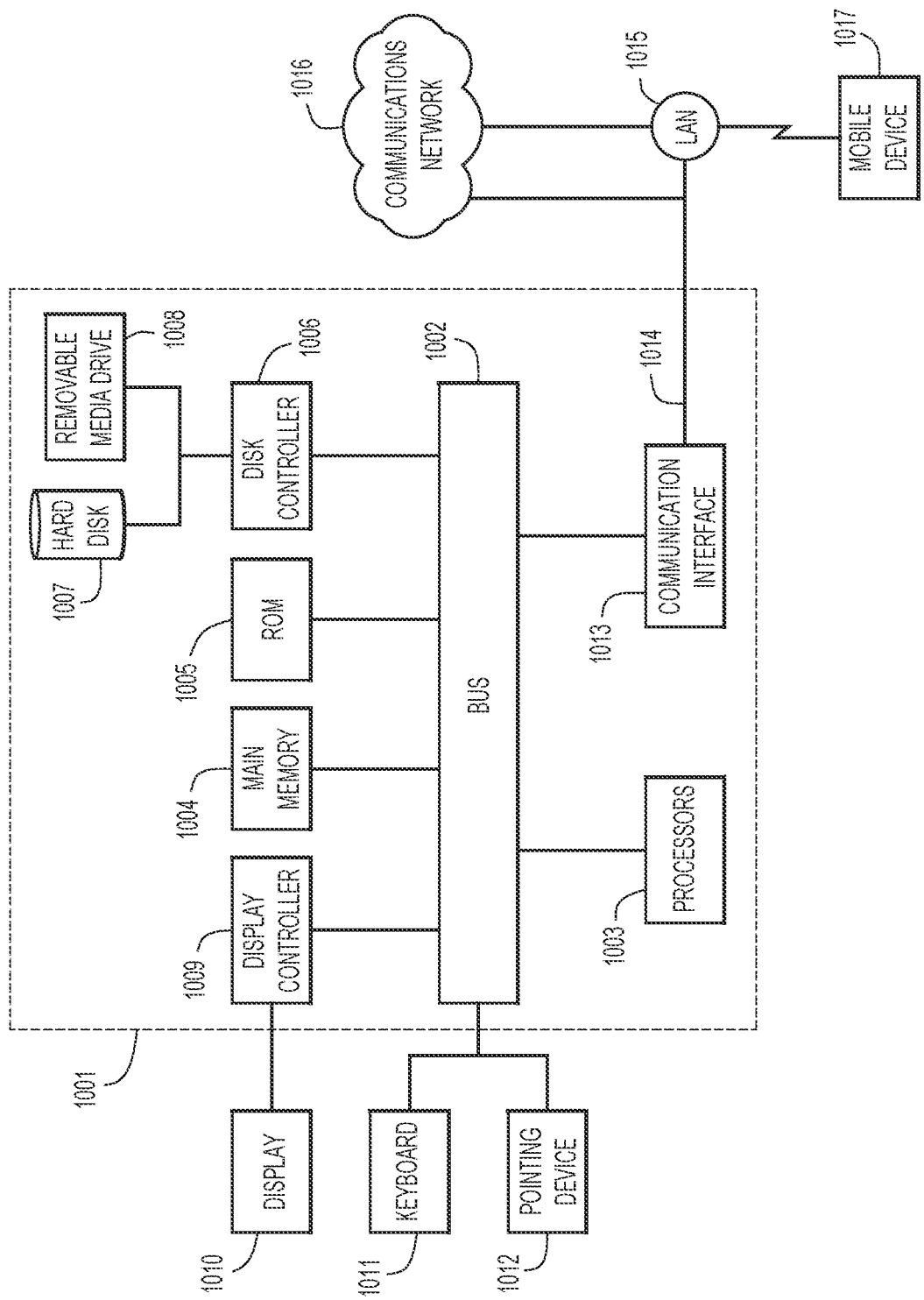
FIG. 10 is a simplified block diagram of a computing device that may be configured to perform methods presented herein, according to an example embodiment.

Referring now to FIG. 10, an example of a block diagram of a computer system 1001 that may be representative of the mapping server 170 in which the embodiments presented may be implemented is shown. The computer system 1001 may be programmed to implement a computer based device, such as a mapping server/mapping resolver for a LISP-based computer network. The computer system 1001 includes a bus 1002 or other communication mechanism for communicating information, and a processor 1003 coupled with the bus 1002 for processing the information. While the figure shows a single block 1003 for a processor, it should be understood that the processors 1003 may represent a plurality of processing cores, each of which can perform separate processing. The computer system 1001 also includes a main memory 1004, such as a random access memory (RAM) or other dynamic storage device (e.g., dynamic RAM (DRAM), static RAM (SRAM), and synchronous DRAM (SD RAM)), coupled to the bus 1002 for storing information and instructions to be executed by processor 1003. In addition, the main memory 1004 may be used for storing temporary variables or other intermediate information during the execution of instructions by the processor 1003.

The computer system 1001 further includes a read only memory (ROM) 1005 or other static storage device (e.g., programmable ROM (PROM), erasable PROM (EPROM), and electrically erasable PROM (EEPROM)) coupled to the bus 1002 for storing static information and instructions for the processor 1003.

The computer system 1001 also includes a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, and removable magneto-optical drive, solid state drive, etc.). The storage devices may be added to the computer system 1001 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 1001 may also include a display controller 1009 coupled to the bus 1002 to control a display 1010, such as a liquid crystal display (LCD) or light emitting diode (LED) display, for displaying information to a computer user. The computer system 1001 includes input devices, such as a keyboard 1011 and a pointing device 1012, for interacting with a computer user and providing information to the processor 1003. The pointing device 1012, for example, may be a mouse, a trackball, track pad, touch screen, or a pointing stick for communicating direction information and command selections to the processor 1003 and for controlling cursor movement on the display 1010. In addition, a printer may provide printed listings of data stored and/or generated by the computer system 1001.

The computer system 1001 performs a portion or all of the processing steps of the operations presented herein in response to the processor 1003 executing one or more sequences of one or more instructions contained in a memory, such as the main memory 1004. Such instructions may be read into the main memory 1004 from another computer readable storage medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1001, for driving a device or devices for implementing the operations presented herein, and for enabling the computer system 1001 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1016 such as the Internet. For example, the communication interface 1013 may be a wired or wireless network interface card to attach to any packet switched (wired or wireless) LAN. As another example, the communication interface 1013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1013 sends and receives electrical, electromagnetic or optical signals that carry digital data streams representing various types of information.

The network link 1014 typically provides data communication through one or more networks to other data devices. For example, the network link 1014 may provide a connection to another computer through a local area network 1015 (e.g., a LAN) or through equipment operated by a service provider, which provides communication services through a communications network 1016. The local network 1014 and the communications network 1016 use, for example, electrical, electromagnetic, or optical signals that carry digital data streams, and the associated physical layer (e.g., CAT 5 cable, coaxial cable, optical fiber, etc.). The signals through the various networks and the signals on the network link 1014 and through the communication interface 1013, which carry the digital data to and from the computer system 1001 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1001 can transmit and receive data, including program code, through the network(s) 1015 and 1016, the network link 1014 and the communication interface 1013. Moreover, the network link 1014 may provide a connection through a LAN 1015 to a mobile device 1017 such as a personal digital assistant (PDA), tablet computer, laptop computer, or cellular telephone.

In summary, the techniques presented herein provide for on-demand, dynamic allocation of cryptographic tunnels that enables a more efficient use of cryptographic resources available at individual network elements. Given a finite set of cryptographic resources, the dynamic allocation system described herein provides a better match to the high level cryptographic policy to provide end-to-end confidentiality and integrity protection within the overlay fabric. The system also provides a fine grained control over the encryption policy, providing pairwise per-tunnel, per-VNI, and per-Security Group encryption. Additionally, the techniques presented herein may be used to optimize the amount of cryptographic state information stored at the receiver for incoming SAs. That state information may be stored, in an encrypted form, either at the mapping server (and provided on-demand to the receiver), or at the sender (and provided via the data plane to the receiver). This frees up cryptographic resources (e.g., SA cache space) to allow the network element to handle more outgoing SAs, improving the total number of end-to-end SAs that can be handled by small scale network elements.

In one form, a method is provided for a mapping server to provision network elements to optimize the cryptographic resources on the cryptographic overlay. The method includes obtaining from a first network element among a plurality of network element, a request for a first endpoint to communicate with a second endpoint across the plurality of network elements. The method further includes determining a cryptographic policy based on the first endpoint, the second endpoint, and an availability of cryptographic resources on the plurality of network elements. The method also includes identifying a second network element among the plurality of network elements based on the cryptographic policy. The second network element is associated with the second endpoint. The method includes selecting a security association based on the cryptographic policy to secure a communication from the first endpoint to the second endpoint. The security association secures the communication between the first network element and the second network element. The method further includes providing the security association to the first network element with a network address of the second network element.

In another form, an apparatus is provided comprising a network interface and a processor. The network interface is configured to communicate with a plurality of network elements. The processor is configured to obtain from a first network element among the plurality of network elements via the network interface, a request for a first endpoint to communicate with a second endpoint across the plurality of network elements. The processor is further configured to determine a cryptographic policy based on the first endpoint, the second endpoint, and an availability of cryptographic resources on the plurality of network elements. The processor is also configured to identify a second network element among the plurality of network elements based on the cryptographic policy. The processor is configured to select a security association based on the cryptographic policy to secure a communication from the first endpoint to the second endpoint. The security association secures the communication between the first network element and the second network element. The processor is also configured to cause the network interface to provide the security association to the first network element with a network address of the second network element.

In yet another form, one or more non-transitory computer readable storage media is encoded with software comprising computer executable instructions and, when the software is executed by a processor on a network element, operable to cause the processor to obtain from a first network element among a plurality of network elements, a request for a first endpoint to communicate with a second endpoint across the plurality of network elements. The software is further operable to cause the processor to determine a cryptographic policy based on the first endpoint, the second endpoint, and an availability of cryptographic resources on the plurality of network elements. The software is also operable to cause the processor to identify a second network element among the plurality of network elements based on the cryptographic policy. The software is operable to cause the processor to select a security association based on the cryptographic policy to secure a communication from the first endpoint to the second endpoint. The security association secures the communication between the first network element and the second network element. The software is further operable to cause the processor to provide the security association to the first network element with a network address of the second network element.

The above description is intended by way of example only. Although the present disclosure has been described in detail with reference to particular arrangements and configurations, these example configurations and arrangements may be changed significantly without departing from the scope of the present disclosure.

What is claimed is:

1. A method comprising:
at a first network element among a plurality of network elements, obtaining data from a first endpoint associated with the first network element, the data identifying a destination of a second endpoint remote from the first network element;
providing a map request to a mapping server, the map request identifying the second endpoint;
obtaining a map reply from the mapping server, the map reply including a network address of a second network element associated with the second endpoint and a security association;
generating encrypted data by encrypting the data for the second endpoint with the security association according to a cryptographic policy based on the first endpoint, the second endpoint, and an availability of cryptographic resources on the plurality of network elements; and
providing the encrypted data to the second network element.

2. The method of claim 1, further comprising:
obtaining an updated security association from the mapping server, the updated security association based on an updated cryptographic policy;
generating updated encrypted data by encrypting subsequent data for the second endpoint with the updated security association; and
providing the updated encrypted data to the second network element.

3. The method of claim 2, wherein the updated cryptographic policy is based on an update to the availability of cryptographic resources on the plurality of network elements.

4. The method of claim 1, further comprising:
obtaining a network address of a third network element that is a re-encapsulation router interposed between the first network element and the second network element on a route from the first endpoint to the second endpoint;
obtaining a new security association for communicating with the third network element;
generating new encrypted data by encrypting the data for the second network element with the new security association; and
providing the new encrypted data to the third network element.

5. The method of claim 1, wherein the second network element is a re-encapsulation router interposed between the first network element and a third network element on a route from the first endpoint to the second endpoint.

6. The method of claim 1, wherein the cryptographic policy is based on a group identity of the first endpoint and the second endpoint.

7. The method of claim 6, wherein the group identity of the first endpoint and the second endpoint is a Virtual Network Identifier (VNI) or a security group identifier.

8. An apparatus comprising:
a network interface configured to communicate with a plurality of network elements; and
a processor coupled to the network interface and configured to:
receive data via the network interface from a first endpoint associated with the apparatus, the data identifying a destination of a second endpoint remote from the apparatus;
cause the network interface to send a map request to a mapping server, the map request identifying the second endpoint;
receive a map reply from the mapping server via the network interface, the map reply including a network address of a remote network element associated with the second endpoint and a security association;
generate encrypted data by encrypting the data for the second endpoint with the security association according to a cryptographic policy based on the first endpoint, the second endpoint, and an availability of cryptographic resources on the plurality of network elements; and
cause the network interface to send the encrypted data to the remote network element.

9. The apparatus of claim 8, wherein the processor is further configured to:
receive an updated security association from the mapping server via the network interface, the updated security association based on an updated cryptographic policy;
generate updated encrypted data by encrypting subsequent data for the second endpoint with the updated security association; and
cause the network interface to send the updated encrypted data to the remote network element.

10. The apparatus of claim 9, wherein the updated cryptographic policy is based on an update to the availability of cryptographic resources on the plurality of network elements.

11. The apparatus of claim 8, wherein the processor is further configured to:
receive via the network interface, a network address of a re-encapsulation router interposed between the apparatus and the remote network element on a route from the first endpoint to the second endpoint;
receive via the network interface, a new security association for communicating with the re-encapsulation router;
generate new encrypted data by encrypting the data for the remote network element with the new security association; and
cause the network interface to send the new encrypted data to the re-encapsulation router.

12. The apparatus of claim 8, wherein the remote network element is a re-encapsulation router interposed between the apparatus and an egress network element on a route from the first endpoint to the second endpoint.

13. The apparatus of claim 8, wherein the cryptographic policy is based on a group identity of the first endpoint and the second endpoint.

14. The apparatus of claim 13, wherein the group identity of the first endpoint and the second endpoint is a Virtual Network Identifier (VNI) or a security group identifier.

15. One or more non-transitory computer readable storage media encoded with software comprising computer executable instructions and, when the software is executed by a processor on a first network element, operable to cause the processor to:
obtain data from a first endpoint associated with the first network element, the data identifying a destination of a second endpoint remote from the first network element;
provide a map request to a mapping server, the map request identifying the second endpoint;
obtain a map reply from the mapping server, the map reply including a network address of a second network element associated with the second endpoint and a security association;
generate encrypted data by encrypting the data for the second endpoint with the security association according to a cryptographic policy based on the first endpoint, the second endpoint, and an availability of cryptographic resources on a plurality of network elements including the first network element and the second network element; and
provide the encrypted data to the second network element.

16. The non-transitory computer readable storage media of claim 15, further comprising instructions operable to cause the processor to:
obtain an updated security association from the mapping server, the updated security association based on an updated cryptographic policy;
generate updated encrypted data by encrypting subsequent data for the second endpoint with the updated security association; and
provide the updated encrypted data to the second network element.

17. The non-transitory computer readable storage media of claim 16, wherein the updated cryptographic policy is based on an update to the availability of cryptographic resources on the plurality of network elements.

18. The non-transitory computer readable storage media of claim 15, further comprising instructions operable to cause the processor to:
obtain a network address of a third network element that is a re-encapsulation router interposed between the first network element and the second network element on a route from the first endpoint to the second endpoint;
obtain a new security association for communicating with the third network element;
generate new encrypted data by encrypting the data for the second network element with the new security association; and provide the new encrypted data to the third network element.

19. The non-transitory computer readable storage media of claim 15, wherein the second network element is a re-encapsulation router interposed between the first network element and a third network element on a route from the first endpoint to the second endpoint.

20. The non-transitory computer readable storage media of claim 15, wherein the cryptographic policy is based on a group identity of the first endpoint and the second endpoint.

* * * * *